Figures 1, 2:
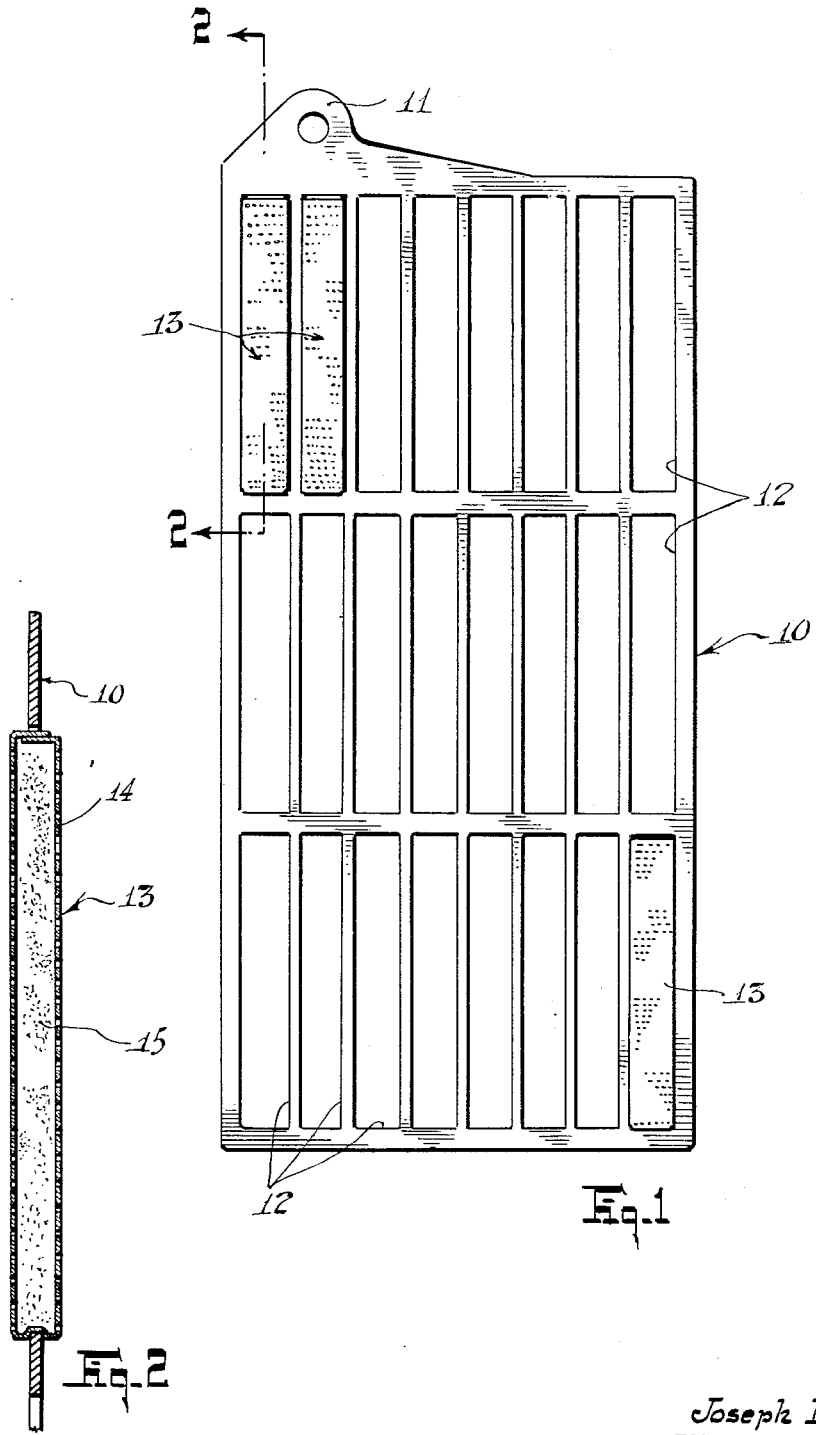

INVENTOR
Joseph Donald Moulton
BY George H. Fritzinger
Agt.

2,727,080
ACTIVE MATERIAL FOR ALKALINE STORAGE CELLS AND METHODS OF PREPARING SAME

Joseph Donald Moulton, West Orange, N. J., assignor to Thomas A. Edison, Incorporated, West Orange, N. J., a corporation of New Jersey Application December 29, 1953, Serial No. 401,041

11 Claims. (Cl. 136—24)

This invention relates to alkaline storage cells, such as use positive electrodes whose active material is principally nickel oxide, and more particularly the invention relates to improved negative electrodes for such cells which have a substantially increased life. Although the invention is especially useful in connection with negative electrodes for storage cells of the alkaline type, no unnecessary limitation thereto is intended since the invention may be applicable as well to other negative electrodes.

The invention is beneficial with negative electrodes of both the cadmium and iron types, the phrase "electrodes of cadmium and iron types" being herein employed to refer to electrodes using so-called cadmium active material and iron active material respectively. The phrase "cadmium active material" is herein employed to refer to pulverulent materials composed predominantly of cadmium hydroxide mixed with varying minor proportions of iron active material, and the phrase "iron active material" is herein employed to refer to pulverulent materials composed of substantially equal amounts of finely-divided metallic iron and ferrous oxide. Alternatively, "cadmium active material" may refer to a mixture composed predominantly of finely-divided metallic cadmium and a minor percentage of metallic iron.

Another object of my invention is to provide an addition agent, which may be also termed an "expander," which when added to negative electrodes having either cadmium or iron active materials will enhance greatly the life of such electrodes in alkaline cells.

Another object is to provide a novel and improved active material for the negative electrodes of alkaline cells, which includes a small percentage of solid rubber as an addition agent and/or expander, and a still further object is to provide novel methods of preparing such cadmium and iron active materials with rubber.

In the description of my invention, reference is had to the accompanying drawings, of which:

Figure 1 is a side elevation of a common form of negative electrode in which my invention is incorporated; and Figure 2 is a partial section on the line 2—2 of Figure 1.

In carrying out my invention, the rubber is preferably added initially in any of various liquid forms. These liquid forms comprise latices, other emulsions (including dispersions) and solutions of natural rubber, synthetic rubber and/or of reclaimed rubber. In the specification and claims, the term "rubber-containing liquid" is used to cover any one or mixtures of the foregoing emulsions and solutions, and the term "rubber" is used in a generic sense to cover natural rubber, synthetic rubber and reclaimed forms thereof. After addition of the rubber-containing liquid, such liquid and the active material are thoroughly mixed and processed in the manner hereinafter described, to produce a dry (and somewhat granular conglomerate) product ready for packing in pockets of cell electrodes and containing solid rubber which functions as an effective expander. A typical form of such electrode shown in the figure comprises a substantially rectangular frame plate 10 having a connector lug 11 at the top and provided with a series of rectangular apertures 12. Fitted tightly into each aperture is a pocket 13 formed of perforated sheet metal 14 and filled with active material 15 of my invention.

The advantages which flow from the addition of a small percentage of rubber to cadmium and iron active materials have been proven by years of testing. The way these advantages are accomplished is not definitely known, but it is believed that by adding a small percentage of rubber to the active material in the manner of my invention, very fine stable films of solid rubber are formed between discrete particles of active material and/or partially coat these particles to prevent coalescence and densification of the active material during charging and discharging. Moreover, it is believed that these films are either permeable to electrolyte or of a fragmentary character so as not to destroy electrolytic contact with the discrete particles of the mass of active material. In the sense here described, the rubber appears to function as an improved expander, but it is believed that the rubber may also have some beneficial effect as a pure addition agent.

Of the foregoing rubber-containing liquids, I preferably use natural rubber latex of commercial stabilized form, and although I do hereby specifically describe my invention in terms of such latex, I intend no unnecessary limitation of my invention thereto.

The rubber latex is added in small proportions, preferably of the order of only 1% of the principal active metal. Differently stated, the latex is added in the amount of one part of total solids equivalent to ninety-nine parts by weight of principal active metal. For example, cadmium active material may comprise one part of active iron material mixed with ten parts by weight of cadmium hydroxide prepared as by anodic electrolysis of cadmium metal in an aqueous alkaline electrolyte. The average cadmium content of such hydroxide is of the order of 75% and the iron content of such iron active material is of the order of 89%. To this cadmium active material there is added approximately 1% latex on a cadmium metal basis. This means that for each part by weight of cadmium hydroxide in the cadmium active material, there is added approximately .0075 part by weight of 100% latex. Preferably, however, a stock solution of latex is first prepared by diluting approximately a 60% latex solution (a suspension containing 60% total solids and having a specific gravity of .94) with nineteen times by volume of distilled water. Sufficient quantities of cadmium active material and of this stock solution of latex are then mixed thoroughly together in such amounts as to constitute a 1% latex addition as above defined. This mixture is then dried, at an elevated temperature not exceeding substantially the boiling temperature of water, until the liquid agent of the latex is driven off. At such temperature the mixture will dry adequately overnight. The dried material is then rubbed through a screen, typically a 20-mesh, to break up the larger conglomerations and give a somewhat granular product for easy handling, it being understood that each granule of such product will comprise multitudinous small particles of active material conglomerated by interparticle films or coats of solid rubber. This end product is packed under heavy pressure, say between five and fifteen thousand pounds per square inch, into the pockets of a negative electrode. Each such pocket may, for example, contain of the order of eight grams of cadmium active material.

A latex iron active material is prepared by adding approximately 1% latex to the iron active material on an iron basis. By way of example, the method of incorporating the latex into the iron active material may be substantially the same as that above described with respect to cadmium active material. Thus, approximately .0089 part by weight of 100% latex is added to each part of iron active material. However, a stock solution of latex is prepared by diluting each part by volume of 60% latex solution with approximately .8 part of 28% ammonium hydroxide and approximately 18.2 parts of distilled water, all by volume. A sufficient quantity of this stock solution is added then to iron active material to amount to a 1% latex addition by weight of the iron, the same is mixed thoroughly and then dried in an oven at an elevated temperature not exceeding substantially the boiling temperature of water. The dried material is then rubbed through a fine screen, say 20-mesh, and is packed under pressure as above explained into pockets of a negative electrode. Here again, each pocket may contain of the order of eight grams of iron active material with latex.

Each cell tested may comprise one negative electrode and two nickel oxide positive electrodes. The testing was carried out by subjecting each cell to repeated cycles of charging and discharging. Each cycle consisted of charging a cell for about seven hours at a current value which, when the cell was new, would constitute a substantially full charge, and then discharging the cell at the same current value to a terminal voltage of one volt. For comparison purposes, similar cells without latex were also cycled.

It has been found that there is a small loss in initial capacity of about 7% for both cadmium active and iron active materials when using latex, but that this loss prevails only during the first few charge-discharge cycles. Thereafter, those cells with the latex addition outperformed the regular cells of similar construction and size without latex.

Instead of natural rubber latex, I may use with beneficial results the latices of synthetic rubbers such as of the butadiene-styrene type known commercially as GR–S, the polychloroprene type known commercially as Neoprene, the butadiene acrylonitrile type known commercially as Hycar and Chemigum, and the polysulfide type known commercially as Thiokol. Also, other emulsions, water dispersions and/or solutions of rubber in suitable solvent such as of naphtha or benzene may be employed with beneficial results. The advantage of starting with the rubber in such liquid forms is that an even mixture of rubber solids with the active material is made readily feasible, and upon drying out the liquid agent, whether it be water, an emulsfiying agent and/or a solvent, a film-like coating of solid rubber residue appears on the discrete particles of the active material in a form which serves highly effectively as an expander, which is stable in alkaline solution and which is yet permeable to alkaline electrolyte to enable efficient ionic current flow to the respective particles of the active material.

Although the particular methods of preparing the cadmium and iron active materials with rubber which are herein described are particularly effective and economical, it will be understood that modifications and variations in these methods as well as in the final products thereof are contemplated within the spirit and scope of my invention, which I endeavor to express according to the following claims.

I claim:

1. A negative electrode for storage cells comprising a material selected from the group consisting of cadmium active material and iron active material, and a small proportion of solid rubber in intimate mixture therewith.

2. A negative electrode for alkaline cells comprising an intimate mixture of pulverulent metallic cadmium and approximately 1% of rubber.

3. A negative electrode for alkaline cells comprising an intimate mixture of finely divided metallic iron and ferrous oxide, and approximately 1% of rubber.

4. A dry, active material for cadmium negatives of alkaline cells comprising a major proportion of cadmium hydroxide and a minor proportion of active iron material of pulverulent form intimately mixed with and conglomerated by a small proportion of rubber equal approximately to 1% by weight of the cadmium metal.

5. A dry, active material for the negatives of alkaline cells comprising an intimate mixture of a material selected from the group consisting of cadmium active material and iron active material, and rubber latex solids in the amount of approximately 1% by weight of the principal active metal, said rubber latex solids constituting an interparticle film formation permeable to alkaline electrolyte and effective to prevent densification of the active material mass during charging and discharging of the cells.

6. An active material for negative electrodes of alkaline cells prepared by subjecting to electrolytic reduction a mixture comprising a small proportion of rubber and a predominant proportion of at least one substance selected from the group consisting of cadmium hydroxide, finely divided metallic iron and ferrous oxide.

7. In the method of preparing active material for the negatives of alkaline cells, the steps comprising adding a predominant proportion of pulverulent active material, selected from the group consisting of cadmium active material and iron active material, to a small proportion of rubber-containing liquid, intimately mixing said material and rubber-containing liquid, and drying said mix to drive off the liquid agent of the rubber-containing liquid.

8. In the method of preparing active material for the negatives of alkaline cells, the steps comprising adding a predominant proportion of pulverulent active material, selected from the group consisting of cadmium active material and iron active material, to a small proportion of rubber-containing liquid, intimately mixing said material and rubber-containing liquid, heating said mix to drive off the liquid agent of said rubber-containing liquid and to form the mix into conglomerated masses, and breaking up said conglomerated masses into smaller particles.

9. In the method of preparing active material for the cadmium negatives of alkaline cells, the steps comprising adding a predominant proportion of cadmium active material to a small proportion of rubber latex, and intimately mixing said material and rubber latex, and drying said mix.

10. In the method of preparing active materials for the cadmium negatives of alkaline cells, the steps comprising mixing a major proportion of cadmium hydroxide with a minor proportion of iron active material and a small proportion of rubber latex, the rubber latex solids being in the amount of approximately 1% by weight of the cadmium in said hydroxide, drying said mix, forming compacted bodies thereof and subjecting said bodies to electrolytic reduction.

11. In the method of preparing active material for the iron negatives of alkaline cells, the steps comprising mixing a major proportion of pulverulent active iron material with a dilute aqueous solution of rubber latex containing ammonium hydroxide, the rubber latex solids being in the amount of approximately 1% by weight of the iron in said iron active material, drying said mixture, forming compacted bodies thereof and subjecting said bodies to electrolytic reduction.

References Cited in the file of this patent

UNITED STATES PATENTS

| | | |
|---|---|---|
| 983,430 | Estelle | Feb. 7, 1911 |
| 2,554,125 | Salauze | May 22, 1951 |
| 2,677,006 | Ameln | Apr. 27, 1954 |
| 2,677,713 | Weil et al. | May 4, 1954 |